(12) United States Patent
Nishikawa

(10) Patent No.: US 8,995,566 B2
(45) Date of Patent: Mar. 31, 2015

(54) COMMUNICATION APPARATUS AND COMMUNICATION METHOD

(71) Applicant: Icom Incorporated, Osaka (JP)

(72) Inventor: Nobuyoshi Nishikawa, Osaka (JP)

(73) Assignee: Icom Incorporated, Osaka (JP)

( * ) Notice: Subject to any disclaimer, the term of this patent is extended or adjusted under 35 U.S.C. 154(b) by 188 days.

(21) Appl. No.: 13/707,355

(22) Filed: Dec. 6, 2012

(65) Prior Publication Data

US 2013/0223560 A1 Aug. 29, 2013

(30) Foreign Application Priority Data

Feb. 24, 2012 (JP) .................................. 2012-038399

(51) Int. Cl.
*H04L 25/03* (2006.01)
*H04L 27/26* (2006.01)

(52) U.S. Cl.
CPC .................................. *H04L 27/2614* (2013.01)
USPC ....................................................... 375/296

(58) Field of Classification Search
USPC ........... 375/260, 295–297; 370/203, 206, 210
See application file for complete search history.

(56) References Cited

U.S. PATENT DOCUMENTS 7,627,046 B1 * 12/2009 Dick et al. ..................... 375/260
8,817,906 B2 * 8/2014 Nishikawa ..................... 375/267

FOREIGN PATENT DOCUMENTS

| JP | 2001274768 | 10/2001 |
|----|------------|---------|
| JP | 2005509365 A | 7/2005 |
| JP | 2006-165781 | 6/2006 |
| JP | 2007311988 | 11/2007 |
| JP | 2008099166 | 4/2008 |
| WO | 02056516 A1 | 7/2002 |

OTHER PUBLICATIONS

English language abstract and machine assisted translation for JP 2001/274768, extracted from www.ipdl.inpit on Jan. 30, 2015, 18 pages.
English language abstract and machine assisted translation for WO/02056516, extracted from www.ipdl.inpit on Feb. 2, 2015, 9 pages.
English language abstract and machine assisted translation for JP 2005/509365 extracted from Espacenet.com on Feb. 2, 2015, 25 pages.

(Continued)

*Primary Examiner* — Tesfaldet Bocure
(74) *Attorney, Agent, or Firm* — Warner Norcross & Judd LLP

(57) ABSTRACT

A modulator generates a modulation signal from an input signal, and a serial-parallel converter generates a subcarrier modulation signal from the modulation signal. An IFFT unit performs an inverse fast Fourier transformation on the subcarrier modulation signal, and a decomposer decomposes a calculation result into a real part data and an imaginary part data. A calculator applies a predetermined calculation with respect to each element the value of which is equal to or greater than a positive threshold value and each element the value of which is equal to or less than a negative threshold value among the real part data and the imaginary part data. A synthesizer synthesizes the real part data and the imaginary part data to generate a baseband signal, and a transmitter generates a transmission signal from the baseband signal, and transmits it to another apparatus via an antenna.

10 Claims, 8 Drawing Sheets

(56) References Cited

OTHER PUBLICATIONS

English language abstract and machine assisted translation for JP 2007/311988, extracted from www.ipdl.inpit on Jan. 30, 2015, 11 pages.

English language abstract and machine assisted translation for JP 2008/099166, extracted from www.ipdl.inpit on Jan. 30, 2015, 11 pages.

English Translation of Japan Office Action, dated Jan. 27, 2015, 2 pages.

* cited by examiner

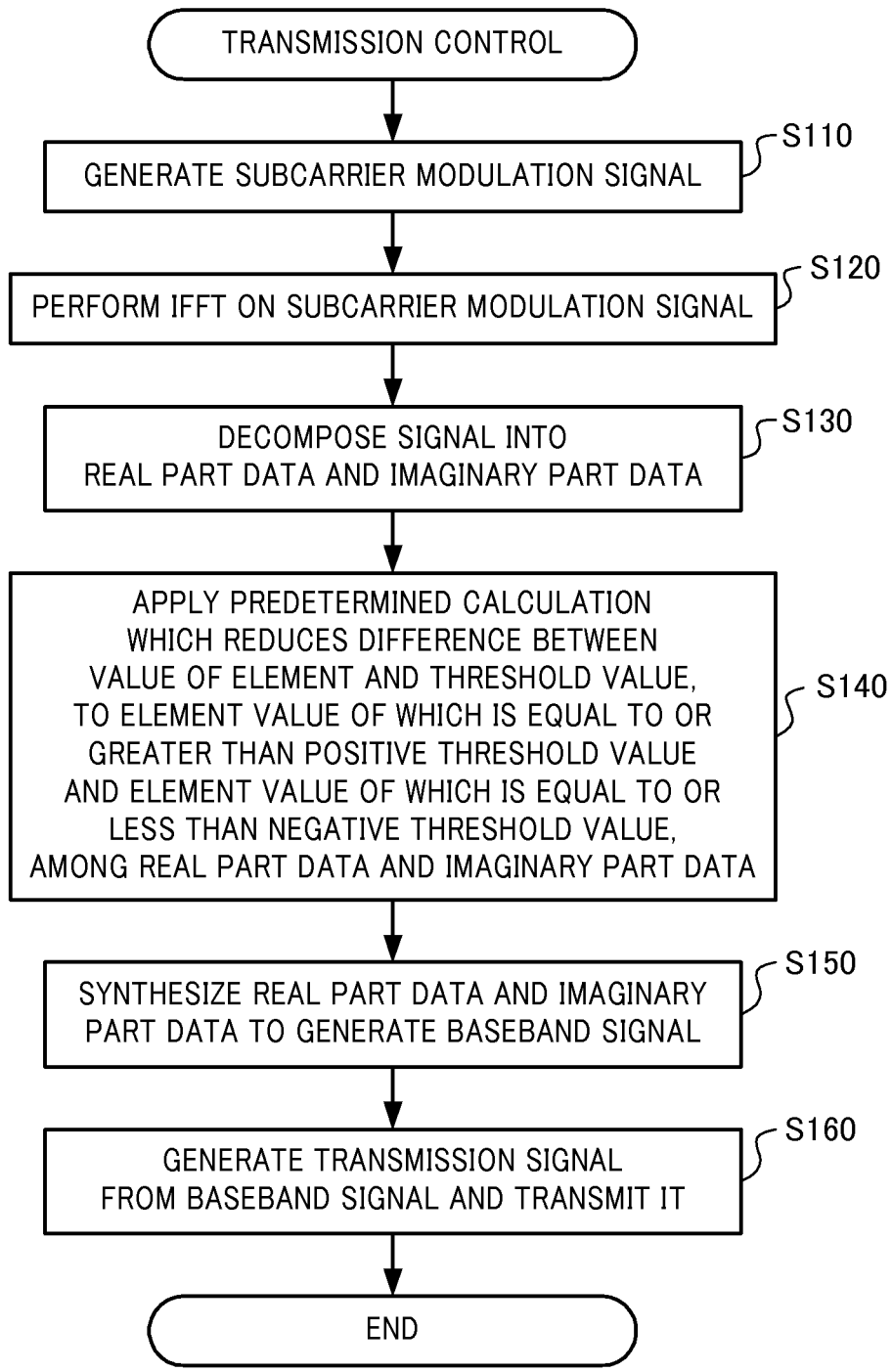

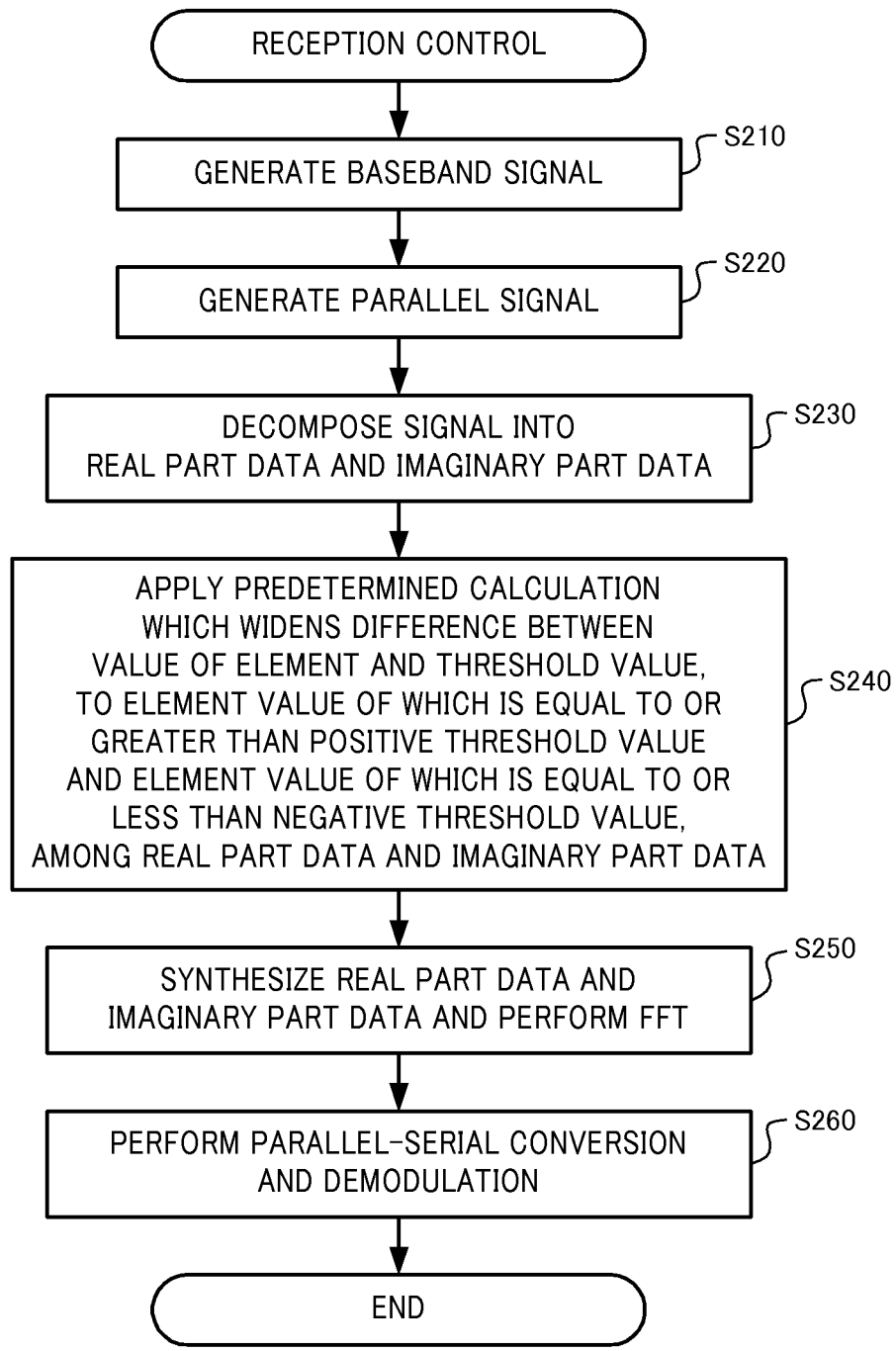

COMMUNICATION APPARATUS AND COMMUNICATION METHOD

CROSS-REFERENCE TO RELATED APPLICATION

This application claims the benefit of Japanese Patent Application No. 2012-038399, filed on Feb. 24, 2012, the entire disclosure of which is incorporated by reference herein.

FIELD

This application relates to a communication apparatus and a communication method.

BACKGROUND

In OFDM (Orthogonal Frequency-Division Multiplexing) communication, an input signal is modulated with subcarriers, and the modulated input signal is subjected to an IFFT (Inverse Fast Fourier Transformation) to generate a baseband signal. When the number of subcarriers increases to increase the FFT (Fast Fourier Transformation) size, therefore, a baseband signal with a high peak is generated, increasing the PAPR (Peak-to-Average Power Ratio). The increase in the PAPR needs an amplifier having a wide range of linearity to transfer a signal without distortion. To meet the requirement, techniques of reducing the PAPR are developed.

Unexamined Japanese Patent Application KOKAI Publication No. 2006-165781 discloses a technique of controlling the phase of a subcarrier modulation signal based on the optimal phase, calculated by a sequential decision procedure, prior to IFFT in order to reduce the PAPR.

The OFDM communication needs to cope with reducing the PAPR. The technique disclosed in Unexamined Japanese Patent Application KOKAI Publication No. 2006-165781 needs to control the phase, subcarrier by subcarrier, by repeatedly calculating the optimal phase to reduce the PAPR. In addition, the technique disclosed in Unexamined Japanese Patent Application KOKAI Publication No. 2006-165781 cannot control the degree of reduction in the PAPR.

SUMMARY

Accordingly, it is desirable to reduce the PAPR in OFDM communication, and control the degree of reduction in the PAPR.

According to a first aspect of the invention, there is provided a communication apparatus for communicating with another apparatus in orthogonal frequency-division multiplexing wireless communication, the communication apparatus comprising:
  a modulator that modulates an input signal using a predetermined modulation scheme, and assigns the modulated input signal to subcarriers with frequency components orthogonal to each other, thereby generating a subcarrier modulation signal;
  a transformer that performs an inverse fast Fourier transformation on the subcarrier modulation signal;
  a decomposer that decomposes a calculation result of the transformer into real part data which is a real part of the calculation result, and imaginary part data which is an imaginary part of the calculation result;
  a calculator that, using a predetermined positive threshold value smaller than a maximum value among elements of an input data which is the real part data or the imaginary part data, and a predetermined negative threshold value greater than a minimum value among the elements of the input data, with respect to each element a value of which is equal to or greater than the positive threshold value among the elements of the input data, applies a predetermined calculation which reduces a difference between the value of the each element and the positive threshold value, and with respect to each element a value of which is equal to or less than the negative threshold value among the elements of the input data, applies a predetermined calculation which reduces a difference between the value of the each element and the negative threshold value;
  a synthesizer that generates a baseband signal based on synthesized data in which the real part data and the imaginary part data applied the calculation by the calculator are synthesized; and
  a transmitter that generates a transmission signal from the baseband signal to transmit.

It is preferable that the calculator may subtract, from a value of each element the value of which is equal to or greater than the positive threshold value among the elements of the input data, a value which is obtained by subtracting the positive threshold value from the value of the each element and dividing by a predetermined first amplitude coefficient greater than 1, and may subtract, from a value of each element the value of which is equal to or less than the negative threshold value among the elements of the input data, a value which is obtained by subtracting the negative threshold value from the value of the each element and dividing by a predetermined second amplitude coefficient greater than 1.

It is preferable that an absolute value of the positive threshold value may be same as an absolute value of the negative threshold value, and the first amplitude coefficient may be same as the second amplitude coefficient.

It is preferable that the calculator may use same positive threshold value and negative threshold value in both cases where the input data is the real part data, and where the input data is the imaginary part data.

According to a second aspect of the invention, there is provided a communication apparatus for communicating with another apparatus in orthogonal frequency-division multiplexing wireless communication, the communication apparatus comprising:
  a receiver that receives a transmission signal and generates a baseband signal;
  a serial-parallel converter that performs serial-parallel conversion on the baseband signal to generate a parallel signal;
  a reception-side decomposer that decomposes the parallel signal into real part data which is a real part of the parallel signal, and imaginary part data which is an imaginary part of the parallel signal;
  an inverse calculator that, with respect to each element a value of which is equal to or greater than a predetermined positive threshold value among elements of input data which is the real part data of the parallel signal or the imaginary part data of the parallel signal, applies a predetermined calculation which widens a difference between the value of the each element and the positive threshold value, and with respect to each element a value of which is equal to or less than a predetermined negative threshold value among the elements of the input data, applies a predetermined calculation which widens a difference between the value of the each element and the negative threshold value;

a reception-side synthesizer that synthesizes the real part data of the parallel signal and the imaginary part data of the parallel signal, which are applied the calculation by the inverse calculator;

a reception-side transformer that performs a fast Fourier transformation on a calculation result by the reception-side synthesizer to generate a subcarrier modulation signal; and a demodulator that demodulates the subcarrier modulation signal by a predetermined demodulation scheme.

It is preferable that the inverse calculator may divide a value, which is obtained by subtracting a predetermined positive threshold value from a value obtained by multiplying a predetermined first amplitude coefficient greater than 1 by a value of each element the value of which is equal to or greater than the positive threshold value among the elements of the input data, by a value which is obtained by subtracting 1 from the first amplitude coefficient, and may divide a value, which is obtained by subtracting a predetermined negative threshold value from a value obtained by multiplying a predetermined second amplitude coefficient greater than 1 by a value of each element the value of which is equal to or less than the negative threshold value among the elements of the input data, by a value which is obtained by subtracting 1 from the second amplitude coefficient.

It is preferable that an absolute value of the positive threshold value may be same as an absolute value of the negative threshold value, and the first amplitude coefficient may be same as the second amplitude coefficient.

It is preferable that the calculator may use same positive threshold value and negative threshold value in both cases where the input data is the real part data, and where the input data is the imaginary part data.

According to a third aspect of the invention, there is provided a communication method that is executed by a communication apparatus communicating with another apparatus in orthogonal frequency-division multiplexing wireless communication, the communication method comprising:

a modulation step of modulating an input signal using a predetermined modulation scheme, and assigning the modulated input signal to subcarriers with frequency components orthogonal to each other, thereby generating a subcarrier modulation signal;

a transformation step of performing an inverse fast Fourier transformation on the subcarrier modulation signal;

a decomposition step of decomposing a calculation result of the transformation step into real part data which is a real part of the calculation result, and imaginary part data which is an imaginary part of the calculation result;

a calculation step of, using a predetermined positive threshold value smaller than a maximum value among elements of an input data which is the real part data or the imaginary part data, and a predetermined negative threshold value greater than a minimum value among the elements of the input data, with respect to each element a value of which is equal to or greater than the positive threshold value among the elements of the input data, applying a predetermined calculation which reduces a difference between the value of the each element and the positive threshold value, and with respect to each element a value of which is equal to or less than the negative threshold value among the elements of the input data, applying a predetermined calculation which reduces a difference between the value of the each element and the negative threshold value;

a synthesis step of generating a baseband signal based on synthesized data in which the real part data and the imaginary part data applied the calculation in the calculation step are synthesized; and a transmission step of generating a transmission signal from the baseband signal to transmit.

According to a fourth aspect of the invention, there is provided a communication method that is executed by a communication apparatus communicating with another apparatus in orthogonal frequency-division multiplexing wireless communication, the communication method comprising:

a reception step of receiving a transmission signal and generating a baseband signal;

a serial-parallel conversion step of performing serial-parallel conversion on the baseband signal to generate a parallel signal;

a reception-side decomposition step of decomposing the parallel signal into real part data which is a real part of the parallel signal, and imaginary part data which is an imaginary part of the parallel signal;

an inverse calculation step of, with respect to each element a value of which is equal to or greater than a predetermined positive threshold value among elements of input data which is the real part data of the parallel signal or the imaginary part data of the parallel signal, applying a predetermined calculation which widens a difference between the value of the each element and the positive threshold value, and with respect to each element a value of which is equal to or less than a predetermined negative threshold value among the elements of the input data, applying a predetermined calculation which widens a difference between the value of the each element and the negative threshold value;

a reception-side synthesis step of synthesizing the real part data of the parallel signal and the imaginary part data of the parallel signal, which are applied the calculation in the inverse calculation step;

a reception-side transformation step of performing a fast Fourier transformation on a calculation result in the reception-side synthesis step to generate a subcarrier modulation signal; and a demodulation step of demodulating the subcarrier modulation signal by a predetermined demodulation scheme.

According to the invention, it is possible to reduce the PAPR in OFDM communication, and further control the degree of reduction in the PAPR.

BRIEF DESCRIPTION OF THE DRAWINGS

A more complete understanding of this application can be obtained when the following detailed description is considered in conjunction with the following drawings, in which:

FIG. 5 is a flowchart illustrating an example of a transmission control operation performed by the communication apparatus according to the embodiment;

FIG. 6 is a flowchart illustrating an example of a reception control operation performed by the communication apparatus according to the embodiment;

DETAILED DESCRIPTION

Figure 1:
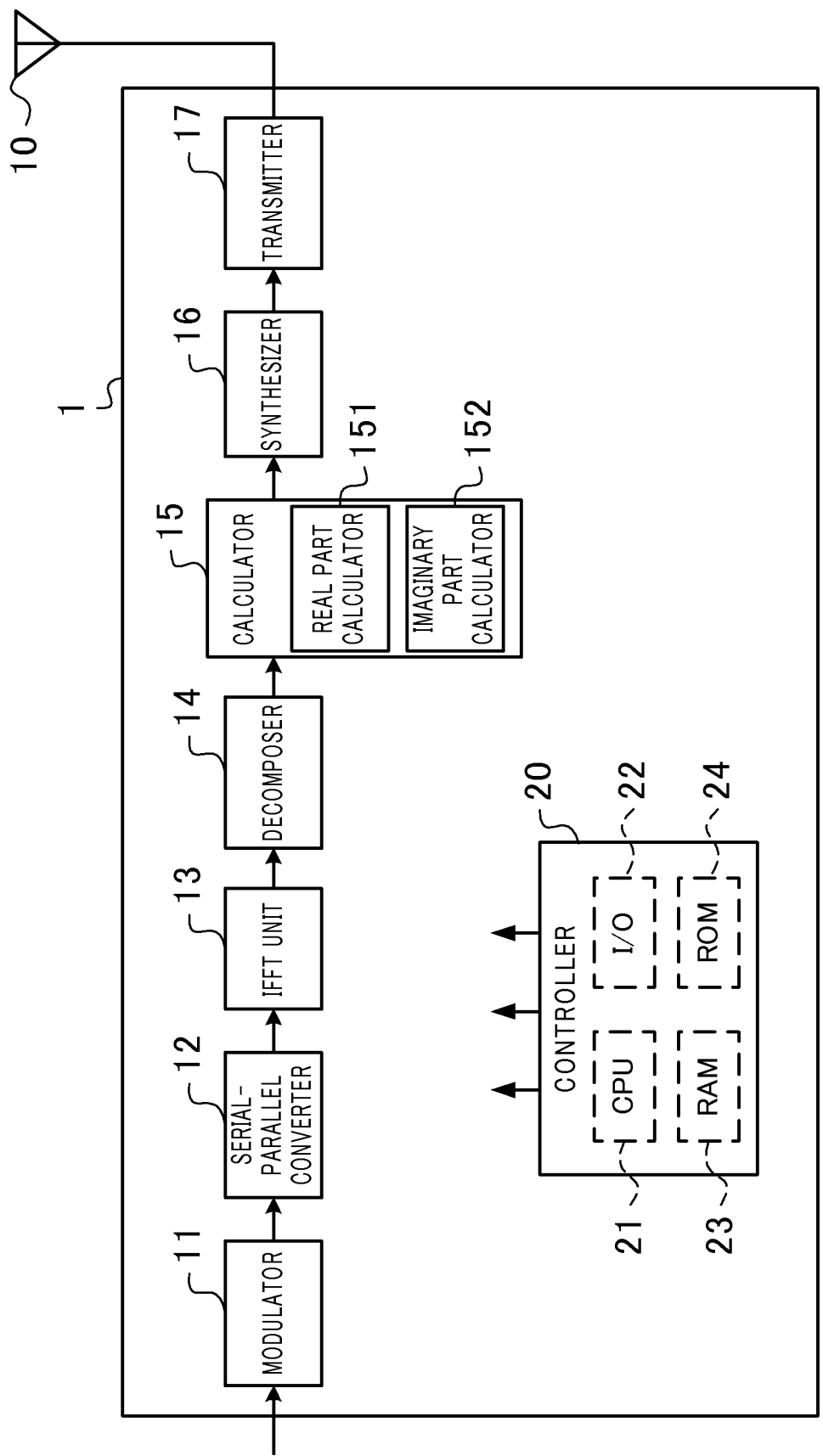
FIG. 1 is a block diagram illustrating a configuration example of a communication apparatus according to the exemplary embodiment of the invention.

An exemplary embodiment of the invention will be described in detail hereinbelow with reference to the accompanying drawings Like or same reference numerals are given to those components which are the same as, or correspond to, the components shown in the diagrams. An IFFT (Inverse Fast Fourier Transformation) is a concept including both IFFT and IDFT (Inverse Discrete Fourier Transformation) hereinafter. Therefore, the embodiment may be configured to perform IDFT instead of an IFFT. Likewise, an FFT (Fast Fourier Transformation) is a concept including both FFT and DFT (Discrete Fourier Transformation) hereinafter. When an IDFT and a DFT are carried out, an FFT size means the size of DFT hereinafter.

FIG. 1 is a block diagram illustrating a configuration example of a communication apparatus according to the exemplary embodiment of the invention. The communication apparatus 1 communicates with another apparatus in OFDM (Orthogonal Frequency-Division Multiplexing) wireless communication. The communication apparatus 1 includes an antenna 10, a modulator 11, a serial-parallel converter 12, an IFFT unit 13, a decomposer 14, a calculator 15, a synthesizer 16, a transmitter 17, and a controller 20. The calculator 15 includes a real part calculator 151 and an imaginary part calculator 152.

The controller 20 includes a CPU (Central Processing Unit) 21, RAM (Random Access Memory) 23, and ROM (Read-Only Memory) 24. Although signal lines from the controller 20 to the individual components are omitted to avoid complication and for the ease of understanding, the controller 20 is connected to the individual components of the communication apparatus 1 via an I/O (Input/Output) unit 22 to start and terminate the processes of the components and control the contents of the processes.

The RAM 23 stores data for generating a transmission frame, for example. The ROM 24 stores a control program for the controller 20 to control the operation of the communication apparatus 1. The controller 20 controls the communication apparatus 1 based on the control program.

Figure 2:
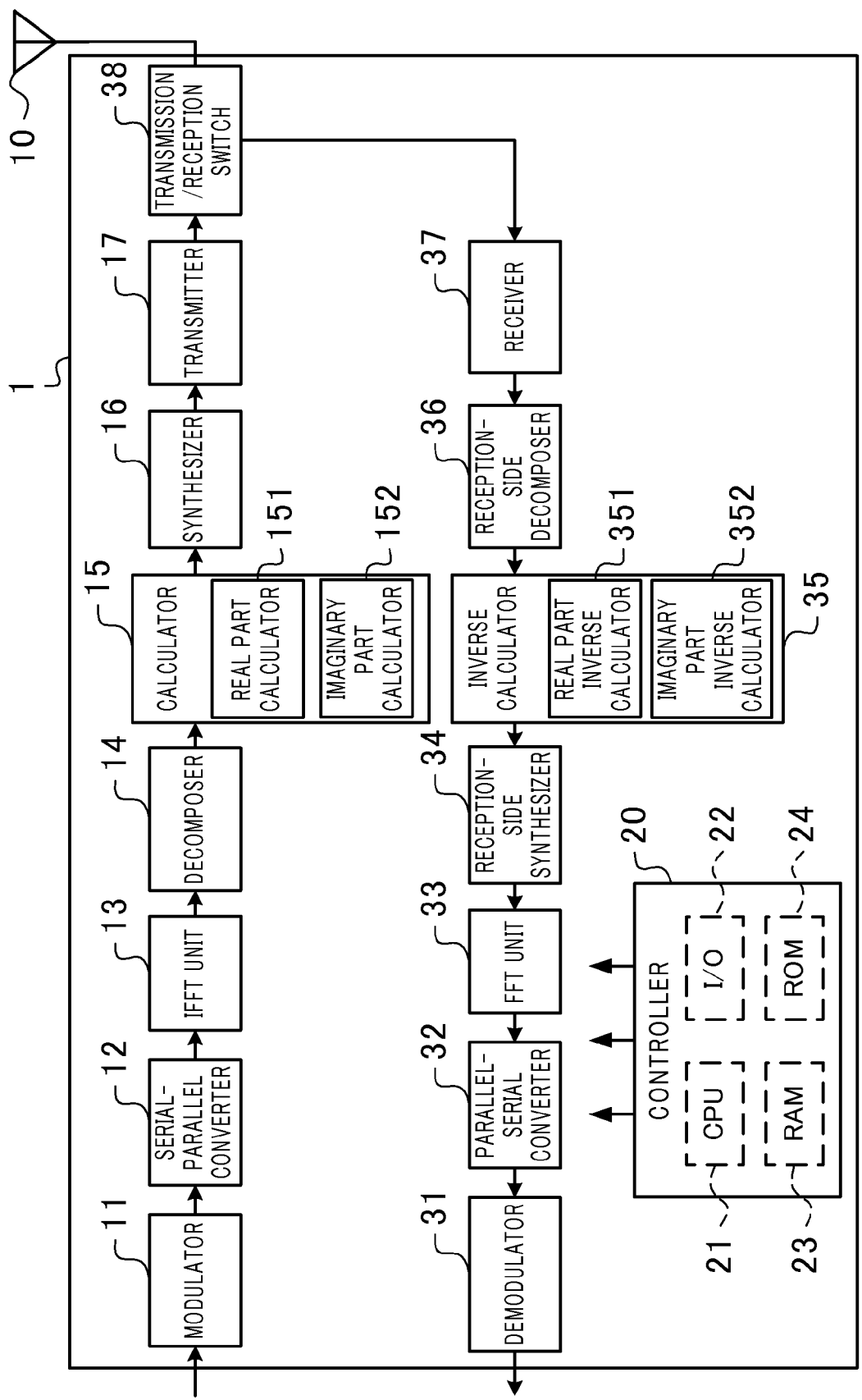
FIG. 2 is a block diagram illustrating a different configuration example of the communication apparatus according to the embodiment.

FIG. 2 is a block diagram illustrating a different configuration example of the communication apparatus according to the embodiment. To provide the communication apparatus 1 with a reception function, the communication apparatus 1 shown in FIG. 2 further includes a demodulator 31, a parallel-serial converter 32, an FFT unit 33, a reception-side synthesizer 34, an inverse calculator 35, a reception-side decomposer 36, a receiver 37, and a transmission/reception switch 38. The inverse calculator 35 includes a real part inverse calculator 351 and an imaginary part inverse calculator 352. Referring to the communication apparatus 1 shown in FIG. 2 which has the transmission function and the reception function, a communication method which is carried out by the communication apparatus 1 will be described hereinbelow.

The modulator 11 modulates an input signal in a predetermined modulation scheme, and generates a modulation signal. The modulator 11 sends the generated modulation signal to the serial-parallel converter 12. The modulator 11 uses, for example, QPSK (Quadrature Phase-Shift Keying) as the modulation scheme. The serial-parallel converter 12 performs serial-parallel conversion on the modulation signal to generate a parallel signal, and assigns the generated parallel signal to subcarriers with frequency components orthogonal to each other to generate a subcarrier modulation signal. The serial-parallel converter 12 sends the generated subcarrier modulation signal to the IFFT unit 13. The IFFT unit 13 performs an IFFT on the subcarrier modulation signal, and sends the calculation result to the decomposer 14.

The decomposer 14 decomposes the calculation result by the IFFT unit 13 into real part data which is a real part of the calculation result, and imaginary part data which is an imaginary part of the calculation result, and sends the real part data and the imaginary part data to the calculator 15. The calculator 15 sends the real part data to the real part calculator 151, and sends the imaginary part data to the imaginary part calculator 152, respectively. The operations of the real part calculator 151 and the imaginary part calculator 152 are the same, therefore the operation of the real part calculator 151 will be described on behalf of the operations. When the subcarrier modulation signal is expressed by d, the real part data u received by the real part calculator 151 is represented by following equation (1).

[Eq. 1]

$$u = \mathrm{Re}(F^{-1} \cdot d) \qquad \ldots (1)$$

The real part calculator 151, with respect to each element a value of which is equal to or greater than a predetermined positive threshold value among elements of the input data which is the real part data, applies a predetermined calculation which reduces a difference between a value of each element and the positive threshold value, and with respect to each element a value of which is equal to or less than a predetermined negative threshold value among the elements of the input data, applies a predetermined calculation which reduces a difference between a value of each element and the negative threshold value. For example, the real part calculator 151 subtracts a value from each of elements the value of which is equal to or greater than the predetermined positive threshold value among the elements of the input data, the subtracting value being obtained by subtracting the positive threshold value from the value of each of the elements and by dividing the result by a first amplitude coefficient which is a predetermined real number greater than 1. The real part calculator 151 subtracts a value from each of elements the value of which is equal to or less than the predetermined negative threshold value among the elements of the input data, the subtracting value being obtained by subtracting the negative threshold value from the value of each of the elements, and by dividing the result by a predetermined second amplitude coefficient greater than 1.

The predetermined positive threshold value is a positive real number smaller than the maximum value of the elements of the input data, and the predetermined negative threshold value is a negative real number greater than the minimum value of the elements of the input data. The predetermined positive threshold value and the negative threshold value are defined in advance as described below in consideration of the degree of reduction of the PAPR (Peak-to-Average Power Ratio), and the degree of degradation of the BER (Bit Error Rate). The absolute value of the positive threshold value and the absolute value of the negative threshold value may have the same value, or may have different values. The first amplitude coefficient and the second amplitude coefficient may have the same value, or may have different values. When constituting the apparatus so that the absolute value of the positive threshold value is same as the absolute value of the negative threshold value and the first amplitude coefficient is same as the second amplitude coefficient, it is possible to simplify implement the above-described calculation process.

When the positive threshold value is expressed by $th_+$, the first amplitude coefficient is expressed by $a_1$, and an element the value of which is equal to or greater than the positive threshold value is expressed by $u_+$ among the elements of the real part data u, $v_+$, which is a result of applying the calculation to $u_+$, by the real part calculator 151 is represented by following equation (2).

[Eq. 2]
$$v_+ = u_+ - \frac{u_+ - th_+}{a_1} \quad (2)$$

On the other hand, when the negative threshold value is expressed by $th_-$, the second amplitude coefficient is expressed by $a_2$, and an element the value of which is equal to or less than the negative threshold value is expressed by $u_-$ among the elements of the real part data u, $v_-$ which is a result of applying the calculation to $u_-$ by the real part calculator 151 is represented by following equation (3).

[Eq. 3]
$$v_- = u_- - \frac{u_- - th_-}{a_2} \quad (3)$$

Note that, the real part calculator 151 does not apply any of above-described calculations to elements each having a value which is greater than the negative threshold value and is smaller than the positive threshold value, among the elements of the real part data u.

The imaginary part calculator 152 performs the above-described calculation process as is the case with the real part calculator 151, the imaginary part data being the input data in the calculation process. The predetermined positive threshold value and the negative threshold value which the real part calculator 151 and the imaginary part calculator 152 use may be different from each other. In cases where the real part calculator 151 and the imaginary part calculator 152 use the same predetermined positive threshold and negative threshold value, the real part calculator 151 and the imaginary part calculator 152 can be realized using one computing unit.

With respect to an element the value of which matches the positive threshold value or the negative threshold value, among the elements of the real part data and the imaginary part data, the value of the element does not change even if applying the above-described calculation to the element. Therefore, the real part calculator 151 and the imaginary part calculator 152 may be configured so as to apply the above-described calculation to each element the value which is greater than the positive threshold value and each element the value which is smaller than the negative threshold value, among the elements of input data.

The calculator 15 transfers the real part data applied the calculation by the real part calculator 151 and the imaginary part data applied the calculation by the imaginary part calculator 152 to the synthesizer 16.

The synthesizer 16 generates a baseband signal based on data in which the transferred real part data and the transferred imaginary part data are synthesized. When the transferred real part data is expressed by v and the transferred imaginary part data is expressed by w, the synthesized data is represented by v+jw. Here, j is an imaginary unit. The transmitter 17 generates a transmission signal from the baseband signal, and transmits the transmission signal to another apparatus via the transmission/reception switch 38 and the antenna 10.

Figure 3A:
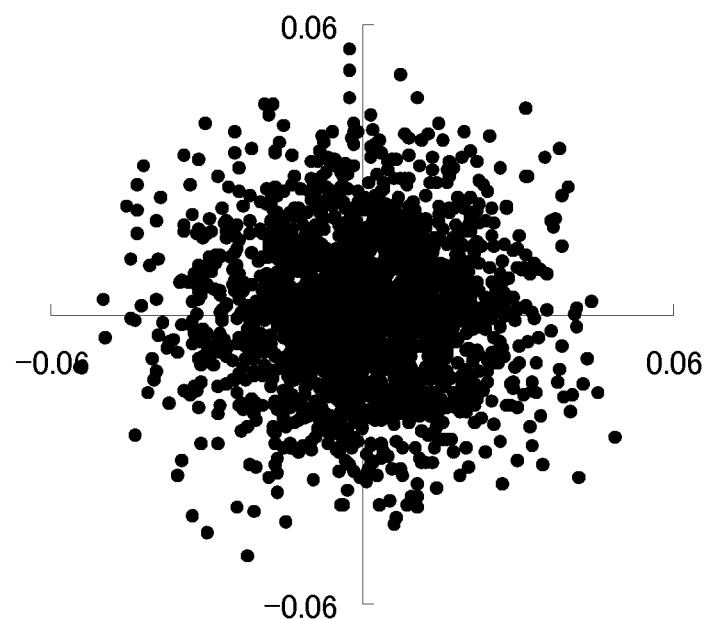
FIGS. 3A and 3B are drawings illustrating changes of signal point arrangement based on a calculation process by a calculator according to the embodiment.
Figure 3B:
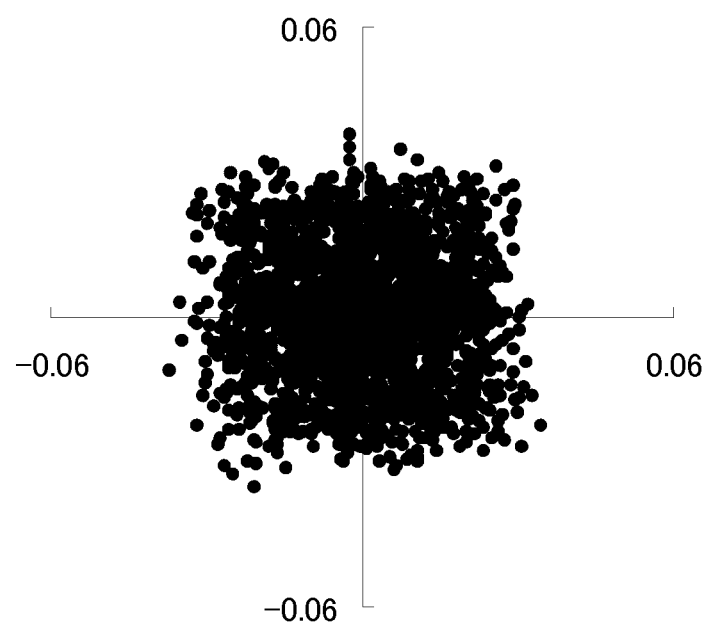

FIGS. 3A and 3B are drawings illustrating changes of signal point arrangement based on a calculation process by the calculator according to the embodiment. Assuming that the FFT size is 2048, the modulation scheme is QPSK, the positive threshold value is 0.02, the negative threshold value is −0.02 and the first amplitude coefficient and the second amplitude coefficient are 2 respectively, and using a certain random signal as the input signal, a simulation is performed. FIG. 3A illustrates a signal point arrangement of the calculation result by the IFFT unit 13. FIG. 3B illustrates a signal point arrangement of the data in which the real part data and the imaginary part data are synthesized by the synthesizer 16. It can be found that the points on a complex plane moves toward an origin of the complex plane, by applying the above-described calculation by the real part calculator 151 and the imaginary part calculator 152.

Figure 4A:
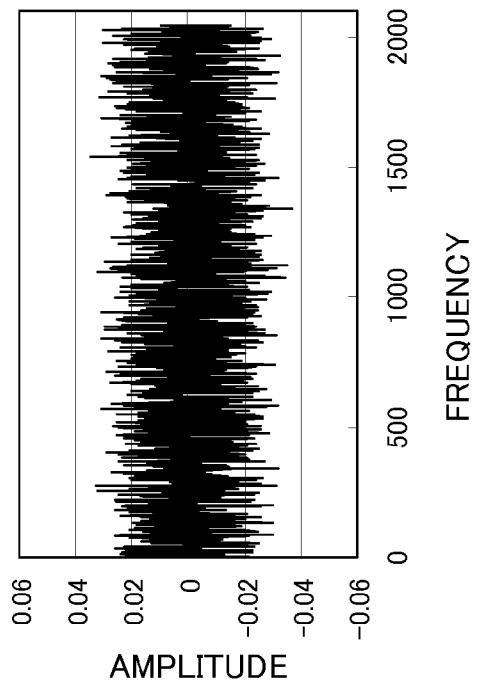
FIGS. 4A to 4D are drawings illustrating changes of the amplitude of the real part data and the imaginary part data based on a calculation process by the calculator according to the embodiment.
Figure 4B:
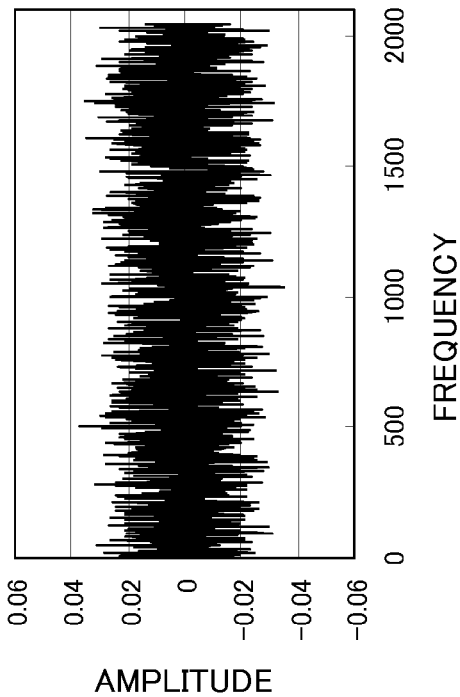
Figure 4C:
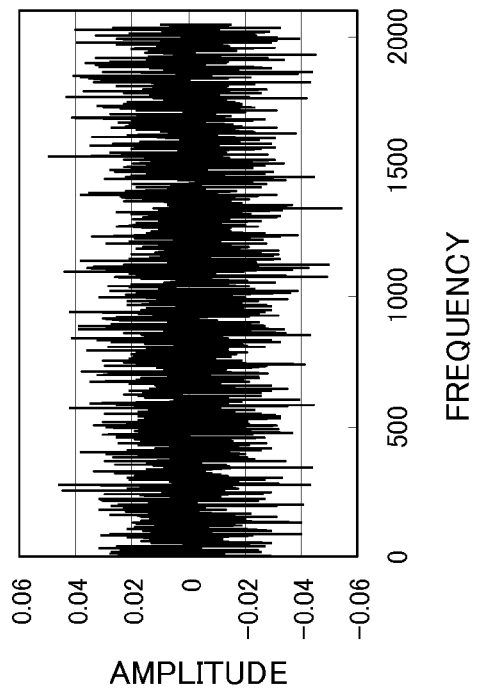
Figure 4D:
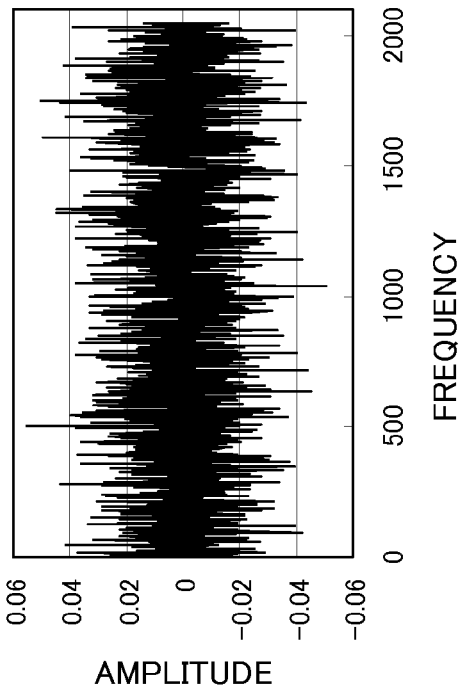

FIGS. 4A to 4D are drawings illustrating changes of the amplitudes of the real part data and the imaginary part data based on a calculation process by the calculator according to the embodiment. The abscissa represents a frequency (unit: subcarrier interval $f_0$), and the ordinate represents an amplitude. FIG. 4A illustrates the real part data generated by the decomposer 14 in the above-described simulation, FIG. 4B illustrates the imaginary part data generated by the decomposer 14, FIG. 4C illustrates the real part data applied the calculation by the real part calculator 151, and FIG. 4D illustrates the imaginary part data applied the calculation by the imaginary part calculator 152. It can be found that, in the real part data and the imaginary part data, the difference between the value of the element equal to or greater than the positive threshold value and the positive threshold value, and the difference between the value of the element equal to or less than the negative threshold value and the negative threshold value are reduced, by applying the above-described calculation in the real part calculator 151 and the imaginary part calculator 152.

FIG. 5 is a flowchart illustrating an example of a transmission control operation performed by the communication apparatus according to the embodiment. The modulator 11 modulates the input signal in a predetermined modulation scheme, and generates a modulation signal. The serial-parallel converter 12 performs serial-parallel conversion on the modulation signal to generate a parallel signal, and assigns the generated parallel signal to subcarriers with frequency components orthogonal to each other to generate a subcarrier modulation signal (step S110). The IFFT unit 13 performs an IFFT on the subcarrier modulation signal (step S120).

The decomposer 14 decomposes the calculation result by the IFFT unit 13 into the real part data which is the real part of the calculation result, and the imaginary part data which is the imaginary part of the calculation result (step S130). The real part calculator 151, with respect to each element the value of which is equal to or greater than the predetermined positive threshold value among the elements of the real part data, applies the predetermined calculation which reduces the difference between the value of each element and the positive threshold value. The real part calculator 151, with respect to each element the value of which is equal to or less than a predetermined negative threshold value among the elements of the real part data, applies the predetermined calculation which reduces the difference between the value of each element and the negative threshold value. The imaginary part calculator 152 applies the similar calculation process to the imaginary part data, as is the case with the real part calculator 151 (step S140).

The synthesizer 16 generates the baseband signal based on the data in which the real part data and the imaginary part data are synthesized (step S150). The transmitter 17 generates the transmission signal from the baseband signal, and transmits the transmission signal to another apparatus via the transmission/reception switch 38 and the antenna 10 (step S160).

The processing on the reception side will be described below. The receiver 37 receives the transmission signal via the antenna 10 and the transmission/reception switch 38, and generates the baseband signal. The receiver 37 sends the generated baseband signal to the reception-side decomposer 36. The reception-side decomposer 36 performs serial-parallel conversion on the baseband signal to generate the parallel signal. The reception-side decomposer 36 decomposes the parallel signal into the real part data which is the real part of the parallel signal, and the imaginary part data which is the imaginary part of the parallel signal, and sends the real part data and imaginary part data of the parallel signal to the inverse calculator 35. The inverse calculator 35 sends the real part data of the parallel signal to the real part inverse calculator 351, and sends the imaginary part data of the parallel signal to the imaginary part inverse calculator 352, respectively. The operations of the real part inverse calculator 351 and the imaginary part inverse calculator 352 are the same, therefore the operation of the real part inverse calculator 351 will be described on behalf of the operations. When the real part data of the parallel signal which the real part inverse calculator 351 received is expressed by r, r matches the real part data v which is applied the calculation by the real part calculator 151 on the transmission side.

The real part inverse calculator 351, with respect to each element the value of which is equal to or greater than the positive threshold value among the elements of the input data which is the real part data of the parallel signal, applies the predetermined calculation which widens the difference between the value of each element and the positive threshold value, and with respect to each element the value of which is equal to or less than the negative threshold value among the elements of the input data, applies the predetermined calculation which widens the difference between the value of each element and the negative threshold value. The predetermined calculation is a calculation for decoding the values of the predetermined elements which are applied the calculation by the real part calculator 151 on the transmission side. For example, the real part inverse calculator 351 multiplies the first amplitude coefficient which is the predetermined real number greater than 1 by each of elements the value of which is equal to or greater than the positive threshold value among the elements of the input data, subtracts the positive threshold value from the multiplied result, and divides the subtracted result by a value which is obtained by subtracting 1 from the first amplitude coefficient. The real part inverse calculator 351 multiplies the second amplitude coefficient which is the predetermined real number greater than 1 by each of elements the value of which is equal to or less than the negative threshold value among the elements of the input data, subtracts the negative threshold value from the multiplied result, and divides the subtracted result by a value which is obtained by subtracting 1 from the second amplitude coefficient.

The predetermined positive threshold and negative threshold value used by the real part inverse calculator 351 are the same as the predetermined positive threshold and negative threshold value used by the real part calculator 151 on the transmission side, respectively. Moreover, the first amplitude coefficient and the second amplitude coefficient used by the real part inverse calculator 351 are the same as the first amplitude coefficient and the second amplitude coefficient used by the real part calculator 151 on the transmission side. It may be premised that pieces of information on the positive threshold value, the negative threshold value, the first amplitude coefficient, and the second amplitude coefficient are held on the reception side beforehand.

When deforming the equation (2) using that $u_-$, is a value equal to or greater than the positive threshold value $th_+$, and the first amplitude coefficient $a_1$ is greater than 1, following equation (4) can be derived from the deformation.

[Eq. 4]

$$v_+ = \left(1 - \frac{1}{a_1}\right)u_+ + \frac{th_+}{a_1} \quad (4)$$
$$\geq \left(1 - \frac{1}{a_1}\right)th_+ + \frac{th_+}{a_1}$$
$$\geq th_+$$

Therefore, the element the value of which is equal to or greater than the positive threshold value, among the elements of the real part data r of the parallel signal, matches the element applied the calculation represented by the above-described equation (2) by the real part calculator 151 on the transmission side. That is, when the element the value of which is equal to or greater than the predetermined positive threshold is expressed by $r_+$, among the real part data r of the parallel signal received by the real part inverse calculator 351, $r_+$ matches $v_+$. The result $s_+$ which is a result of applying the calculation to $r_+$ by the real part inverse calculator 351 is represented by following equation (5). Since $r_+$ matches $v_+$, deforming the above-described equation (5) using the above-described equation (2) leads a relation $s_+=u_+$.

[Eq. 5]

$$s_+ = \frac{a_1 \cdot r_+ - th_+}{a_1 - 1} \quad (5)$$

When deforming the equation (3) using that $u_-$ is a value equal to or less than the negative threshold value $th_-$, and the second amplitude coefficient $a_2$ is greater than 1, following equation (6) can be derived from the deformation.

[Eq. 6]

$$v_- = \left(1 - \frac{1}{a_2}\right)u_- + \frac{th_-}{a_2} \quad (6)$$
$$\leq \left(1 - \frac{1}{a_2}\right)th_- + \frac{th_-}{a_2}$$
$$\leq th_-$$

Therefore, the element the value of which is equal to or less than the negative threshold value, among the elements of the real part data r of the parallel signal, matches the element applied the calculation represented by the above-described equation (3) by the real part calculator 151 on the transmission side. That is, when the element the value of which is equal to or less than the predetermined negative threshold is expressed by r_, among the real part data r of the parallel signal received by the real part inverse calculator 351, r_ matches v_. The result s_ which is a result of applying the calculation to r_ by the real part inverse calculator 351 is represented by following equation (7). Since r_ matches v_, deforming the above-described equation (7) using the above-described equation (3) leads a relation s_=u_.

[Eq. 7]
$$s_- = \frac{a_2 \cdot r_- - th_-}{a_2 - 1} \quad (7)$$

Note that, the real part calculator 351 does not apply any of above-described calculations to elements each having a value which is greater than the negative threshold value and is smaller than the positive threshold value, among the elements of the real part data r of the parallel signal.

The imaginary part inverse calculator 352 performs the above-described calculation process as is the case with the real part inverse calculator 351, the imaginary part data being the input data in the process. As is the case with the real part inverse calculator 351, the predetermined positive threshold and negative threshold value used by the imaginary part inverse calculator 352 are the same as the predetermined positive threshold and negative threshold value used by the imaginary part calculator 152 on the transmission side respectively. The predetermined positive threshold and negative threshold value used by the real part inverse calculator 351 and the imaginary part inverse calculator 352 may be different from each other. In cases where the real part inverse calculator 351 and the imaginary part inverse calculator 352 use the same predetermined positive threshold and negative threshold value, the real part inverse calculator 351 and the imaginary part inverse calculator 352 can be realized using one computing unit. As is the case with the transmission side, the real part inverse calculator 351 and the imaginary part inverse calculator 352 may be configured so as to apply the above-described calculation to each element the value which is greater than the positive threshold value and each element the value which is smaller than the negative threshold value, among the elements of input data.

The inverse calculator 35 transfers the real part data of the parallel signal applied the calculation by the real part inverse calculator 351 and the imaginary part data of the parallel signal applied the calculation by the imaginary part inverse calculator 352 to the reception-side synthesizer 34.

The reception-side synthesizer 34 transfers the data in which the transferred real part data of the parallel signal and the transferred imaginary part data of the parallel signal are synthesized to the FFT unit 33. When the transferred real part data of the parallel signal is expressed by s, and the transferred imaginary part data of the parallel signal is expressed by x, the synthesized data is represented by s+jx. The FFT unit 33 performs an FFT on the data transferred from the reception-side synthesizer 34, and generates a subcarrier modulation signal. The FFT unit 33 sends the subcarrier modulation signal to the parallel-serial converter 32.

The parallel-serial converter 32 performs parallel-serial conversion on the subcarrier modulation signal to generate a serial signal, and sends the serial signal to the demodulator 31. The demodulator 31 demodulates the serial signal by a predetermined demodulation scheme. For example, the demodulator 31 performs QPSK demodulation on the serial signal. Accordingly, the input signal modulated by the modulator 11 can be demodulated and output by the demodulator 31.

FIG. 6 is a flowchart illustrating an example of a reception control operation performed by the communication apparatus according to the embodiment. The receiver 37 receives the transmission signal via the antenna 10 and the transmission/reception switch 38, and generates the baseband signal (step S210). The reception-side decomposer 36 performs serial-parallel conversion on the baseband signal to generate the parallel signal (step S220). The reception-side decomposer 36 decomposes the parallel signal into the real part data which is the real part of the parallel signal, and the imaginary part data which is the imaginary part of the parallel signal (step S230).

With respect to each element the value of which is equal to or greater than the positive threshold value among the elements of the input data which is the real part data of the parallel signal, the real part inverse calculator 351 applies the predetermined calculation which widens the difference between the value of each element and the positive threshold value, and with respect to each element the value of which is equal to or less than the negative threshold value among the elements of the input data, the real part inverse calculator 351 applies the predetermined calculation which widens the difference between the value of each element and the negative threshold value. The imaginary part inverse calculator 352 applies the similar calculation process to the imaginary part data, as is the case with the real part inverse calculator 351 (step S240).

The reception-side synthesizer 34 combines the real part data of the parallel signal and the imaginary part data of the parallel signal, and the FFT unit 33 performs an FFT on the synthesized data to generate a subcarrier modulation signal (step S250). The parallel-serial converter 32 performs parallel-serial conversion on the subcarrier modulation signal to generate the serial signal, and the demodulator 31 demodulates the serial signal in a predetermined demodulation scheme (step S260).

In accordance with the principle described above, the communication apparatus 1 communicates as follows, for example. As an example, it is assumed that the real part data u generated by the decomposer 14 is represented by following equation (8) in cases where the number of subcarriers is 4.

[Eq. 8]
$$u = \begin{bmatrix} 5 \\ -2 \\ 1 \\ -4 \end{bmatrix} \quad (8)$$

As an example, when the positive threshold value is set to 3, the negative threshold value is set to −3, and the first amplitude coefficient and the second amplitude coefficient are set to 2 respectively, the objects of the calculation in the real part calculator 151 are the element in the first line and the element in the fourth line of the above-described equation (8). When the calculation based on the above-described equation (2) is applied to the element of the first line and the calculation based on the above-described equation (3) is applied to the element of the fourth line, the real part data applied the calculation by the real part calculator 151 is represented by following equation (9).

[Eq. 9]
$$v = \begin{bmatrix} 4 \\ -2 \\ 1 \\ -3.5 \end{bmatrix} \quad (9)$$

The processing on the reception side will be described below. The real part data r of the parallel signal generated by the reception-side decomposer 36 matches v which is represented by the above-described equation (9). The objects of the calculation in the real part inverse calculator 351 are the element in the first line and the element in the fourth line of the above-described equation (9). When the calculation based on the above-described equation (5) is applied to the element of the first line and the calculation based on the above-described equation (7) is applied to the element of the fourth line, the real part data s applied the calculation is represented by following equation (10), and matches u which is represented by the above-described equation (8). Therefore, it can be found that the input signal can be decoded on the reception side.

[Eq. 10]
$$s = \begin{bmatrix} 5 \\ -2 \\ 1 \\ -4 \end{bmatrix} \quad (10)$$

As explained above, according to the communication apparatus 1 of the embodiment of the present invention, it is possible to reduce the PAPR in an OFDM communication system by applying the predetermined calculation to the element the value of which is equal to or greater than the positive threshold value, and the element the value of which is equal to or less than the negative threshold value, among the elements of the real part data and the imaginary part data, and by generating the baseband signal. Moreover, as described later, it is possible to reduce the PAPR and to control a degree of reduction of the PAPR.

<Specific Examples>

Next, the advantages of the embodiment of the invention will be described based on the results of simulation. The simulation was performed on generation of baseband signals using random signal as the input signal, and repetitive calculation of the PAPR according to the related art and the embodiment. Assuming that the modulation scheme is QPSK and the FFT size is 2048, CCDF (Complementary Cumulative Distribution Function) of the PAPR, i.e., the characteristic of the probability of occurrence of the PAPR according to the related art were compared to the CCDF of the PAPR according to the embodiment. The related art concerns a method of generating the baseband signal from the subcarrier modulation signal without the calculations described above.

Figure 7:
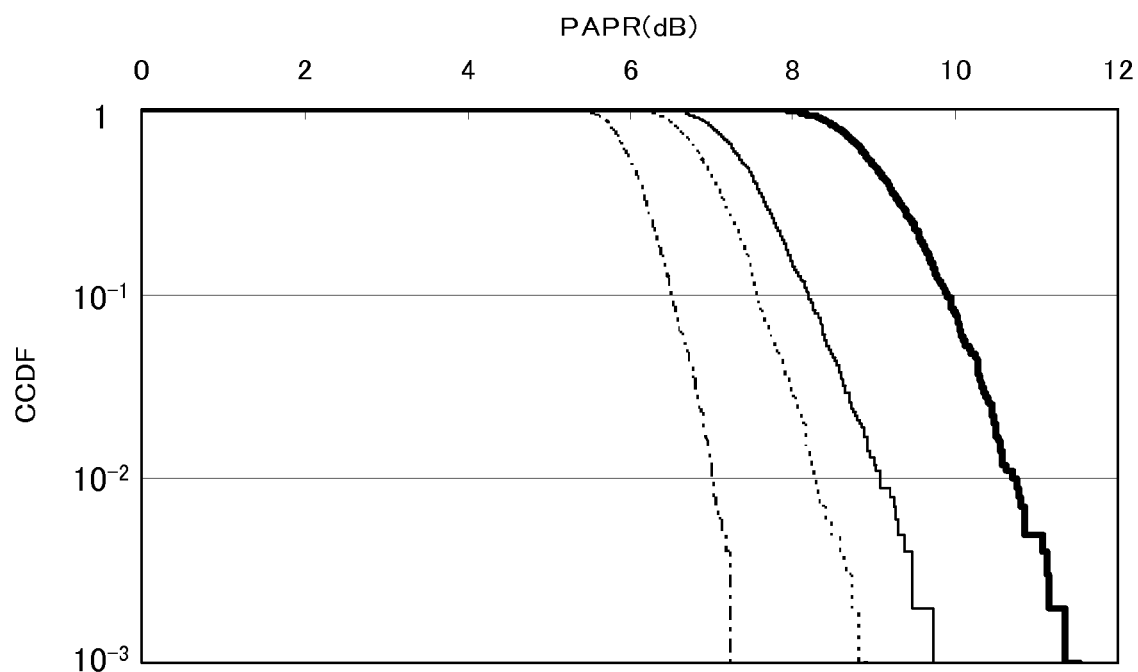
FIG. 7 is a diagram illustrating a relation between simulated CCDF characteristics of the PAPR of the baseband signals, and a first amplitude coefficient and a second amplitude coefficient.

FIG. 7 is a diagram illustrating a relation between simulated CCDF characteristics of the PAPR of the baseband signals, and the first amplitude coefficient and second amplitude coefficient. The abscissa represents the PAPR (unit:dB), and the ordinate represents the CCDF of the PAPR. In the present embodiment, the positive threshold value was fixed to 0.02, the negative threshold value was fixed to −0.02, and the values of the first amplitude coefficient and the second amplitude coefficient were changed. The first amplitude coefficient and the second amplitude coefficient have the same value a. A thick solid-line graph illustrates the CCDF characteristic of the PAPR according to the related art, a thin solid-line graph illustrates a case of a=2.5 in the present embodiment, a dotted-line graph illustrates a case of a=2 in the present embodiment, and a one-dot chain line graph illustrates a case of a=1.5 in the present embodiment. Within the illustrated range, it is found that the PAPR of the present embodiment is reduced in any case in comparison with the related art, and the PAPR is reduced more by causing a to approach 1.

Figure 8:
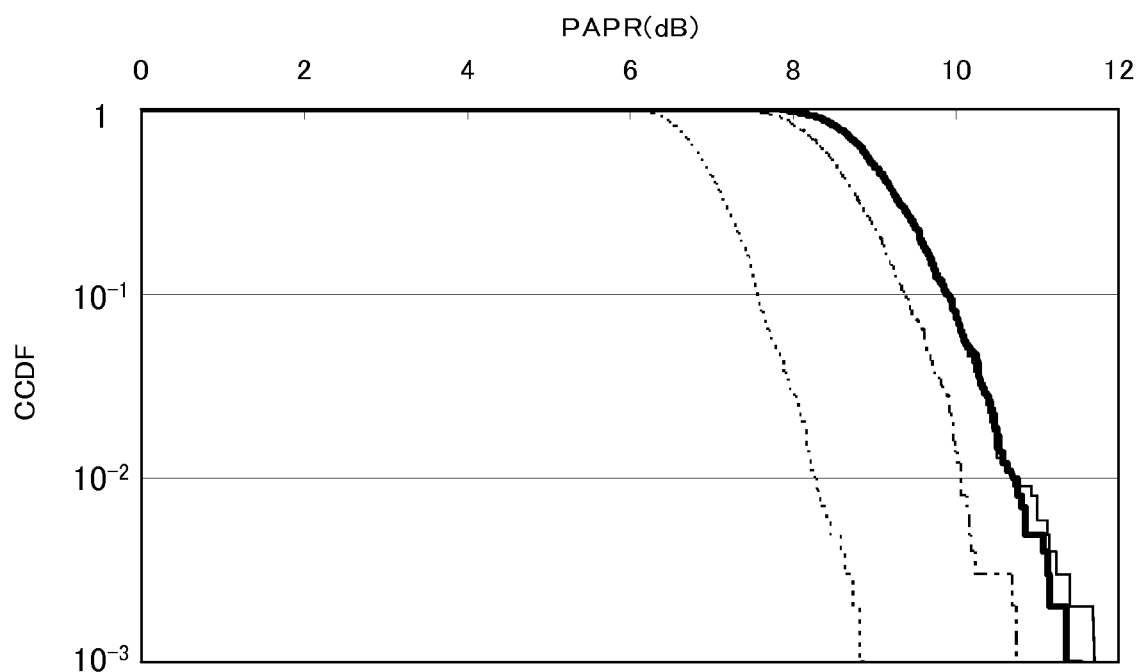
FIG. 8 is a diagram illustrating a relation between simulated CCDF characteristics of the PAPR of the baseband signals and thresholds.

FIG. 8 is a diagram illustrating a relation between simulated CCDF characteristics of the PAPR of the baseband signals and thresholds. The abscissa represents the PAPR (unit:dB), and the ordinate represents the CCDF of the PAPR. In the present embodiment, similar simulation was performed in which the first amplitude coefficient and the second amplitude coefficient were fixed to 2 respectively, and the positive threshold value and the negative threshold value were changed. The absolute values of the positive threshold value and the negative threshold value are the same value th. A thick solid-line graph illustrates the CCDF characteristic of the PAPR according to the related art, a thin solid-line graph illustrates a case of th=0.2 in the present embodiment, a dotted-line graph illustrates a case of th=0.02 in the present embodiment, and a one-dot chain line graph illustrates a case of th=0.002 in the present embodiment. Although the PAPR in the case of th=0.2 is in the same range as the related art, the PAPR is reduced in the cases of th=0.02 and th=0.002 in comparison with the related art. The preferred threshold value for reducing the PAPR depends on the value of input signals and the number of signals. In a case where FFT size was 2048, the preferred value was th=0.02. In the case of th=0.2, the PAPR of the present embodiment of the invention is degraded in a range in the diagram in comparison with the related art. This is because, under a certain condition, the degree of reduction of average power is large rather than the degree of reduction of peak power. Therefore, it may constitutes so as to use preferred positive threshold value and negative threshold value in accordance with FFT size, for example so as to use th=0.02 in a case where FFT size is 2048.

Figure 9:
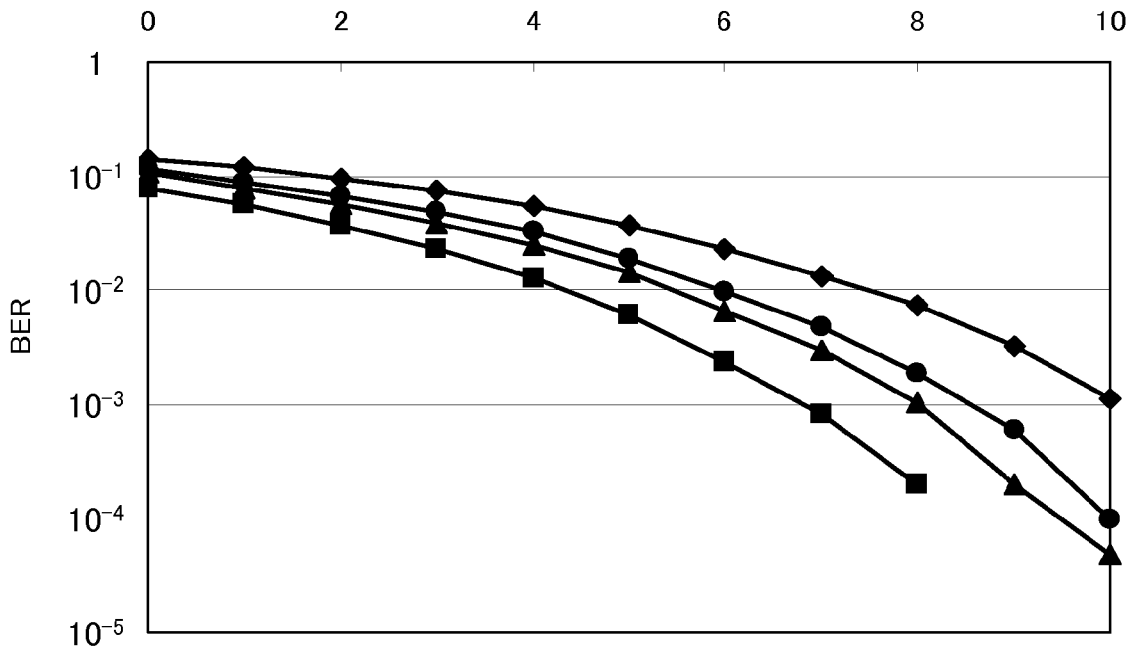
FIG. 9 is a diagram illustrating a relation between simulated BER characteristics, and the first amplitude coefficient and the second amplitude coefficient.

The simulation for the BER was performed similarly. FIG. 9 is a diagram illustrating a relation between simulated BER characteristics, and the first amplitude coefficient and the second amplitude coefficient. The abscissa represents the Eb/No (Energy per Bit to NOise power spectral density ratio), and the ordinate represents the BER. The unit of Eb/No is dB. In the present embodiment, the positive threshold value was fixed to 0.02, the negative threshold value was fixed to −0.02, and the values of the first amplitude coefficient and the second amplitude coefficient were changed. The first amplitude coefficient and the second amplitude coefficient have the same value a. The BER of the related art is illustrated by a graph with square plotting points, a case of a=2.5 in the present embodiment is illustrated by a graph with triangle plotting points, a case of a=2 in the present embodiment is illustrated by a graph with circle plotting points, and a case of a=1.5 in the present embodiment is illustrated by a graph with rhombus plotting points.

In the present embodiment, the BER is more degraded as a approaches 1. As a approaches 1, the values of the elements of the real part data and imaginary part data applied the calculation approach the positive threshold value or the negative threshold value. In cases where the value of the element exceeds the negative threshold value and falls below the positive threshold value due to an influence of the noise in a transmission path, the element is not correctly decoded on the reception side. Accordingly, when a approaches 1, the BER is degraded.

Figure 10:
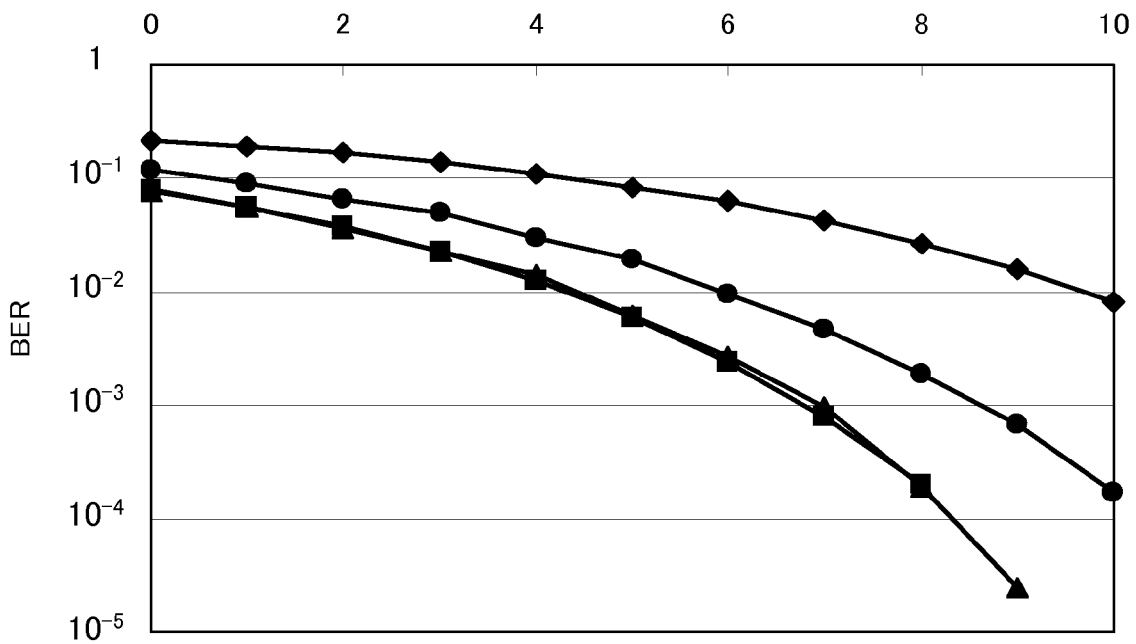
FIG. 10 is a diagram illustrating a relation between simulated BER characteristics and thresholds.

FIG. 10 is a diagram illustrating a relation between simulated BER characteristics and thresholds. The abscissa represents the Eb/No (unit:dB), and the ordinate represents the BER. In the present embodiment, similar simulation was performed in which the first amplitude coefficient and the second amplitude coefficient were fixed to 2 respectively, and the positive threshold value and the negative threshold value were changed. The absolute values of the positive threshold value and the negative threshold value are the same value th. The BER of the related art is illustrated by a graph with square plotting points, a case of the=0.2 in the present embodiment is illustrated by a graph with triangle plotting points, a case of th=0.02 in the present embodiment is illustrated by a graph with circle plotting points, and a case of th=0.002 in the present embodiment is illustrated by a graph with rhombus plotting points.

In the present embodiment, the BER is more degraded as th decreases. Since the element may not be correctly decoded due to the influence of the noise on the reception side as described above, the BER is degraded when th decreases and the number of the elements which are objects of the calculation in the present embodiment increases.

The BER can be improved by raising transmission electric power. Moreover, it is possible to suppress the degradation of the BER to the minimum, by performing a simulation in advance and detecting the preferred positive threshold value and negative threshold value in accordance with FFT size.

According to the above-described simulation, it has been found that the present embodiment can reduce the PAPR by applying the predetermined calculation to the element the value of which is equal to or greater than the positive threshold value, and the element the value of which is equal to or less than the negative threshold value, and by generating the baseband signal. Moreover, it is found that the degree of reduction of the PAPR can be controlled by changing the first amplitude coefficient, the second amplitude coefficient, the positive threshold value, and the negative threshold value.

The modes of the invention are not limited to the foregoing embodiment. The modulation scheme of the modulator 11 is not limited to QPSK, but PSK (Phase Shift Keying), QAM (Quadrature Amplitude Modulation) or the like may be used instead of QPSK. The layout order of the modulator 11 and the serial-parallel converter 12 may be changed so that the serial-parallel converter 12 performs serial-parallel conversion on an input signal and assigns individual pieces of data in the parallel signal to subcarrier signals, and then the modulator 11 modulates the individual pieces of data in the parallel signal by a predetermined modulation scheme. In this case, the demodulation process is carried out on the reception side with the layout order of the demodulator 31 and the parallel-serial converter 32 being changed.

The IFFT unit 13 may be configured to perform an IDFT instead of an IFFT. The FFT unit 33 may be configured to perform a DFT instead of an FFT. The calculation processes by the real part calculator 151 and the imaginary part calculator 152 are not limited to above-described embodiment, and any calculation may be used which reduces the difference between the value of the element equal to or greater than the positive threshold value and the positive threshold value, and the difference between the value of the element equal to or less than the negative threshold value and the negative threshold value.

Having described and illustrated the principles of this application by reference to one or more preferred embodiments, it should be apparent that the preferred embodiments may be modified in arrangement and detail without departing from the principles disclosed herein and that it is intended that the application be construed as including all such modifications and variations insofar as they come within the spirit and scope of the subject matter disclosed herein.

What is claimed is:

1. A communication apparatus for communicating with another apparatus in orthogonal frequency-division multiplexing wireless communication, the communication apparatus comprising:
    a modulator that modulates an input signal using a predetermined modulation scheme, and assigns the modulated input signal to subcarriers with frequency components orthogonal to each other, thereby generating a subcarrier modulation signal;
    a transformer that performs an inverse fast Fourier transformation on the subcarrier modulation signal;
    a decomposer that decomposes a calculation result of the transformer into real part data which is a real part of the calculation result, and imaginary part data which is an imaginary part of the calculation result;
    a calculator that, using a predetermined positive threshold value smaller than a maximum value among elements of an input data which is the real part data or the imaginary part data, and a predetermined negative threshold value greater than a minimum value among the elements of the input data, with respect to each element a value of which is equal to or greater than the positive threshold value among the elements of the input data, applies a predetermined calculation which reduces a difference between the value of the each element and the positive threshold value, and with respect to each element a value of which is equal to or less than the negative threshold value among the elements of the input data, applies a predetermined calculation which reduces a difference between the value of the each element and the negative threshold value;
    a synthesizer that generates a baseband signal based on synthesized data in which the real part data and the imaginary part data applied the calculation by the calculator are synthesized; and
    a transmitter that generates a transmission signal from the baseband signal to transmit.

2. The communication apparatus according to claim 1, wherein,
    the calculator subtracts, from a value of each element the value of which is equal to or greater than the positive threshold value among the elements of the input data, a value which is obtained by subtracting the positive threshold value from the value of the each element and dividing by a predetermined first amplitude coefficient greater than 1, and subtracts, from a value of each element the value of which is equal to or less than the negative threshold value among the elements of the input data, a value which is obtained by subtracting the negative threshold value from the value of the each element and dividing by a predetermined second amplitude coefficient greater than 1.

3. The communication apparatus according to claim 2, wherein, an absolute value of the positive threshold value is same as an absolute value of the negative threshold value, and the first amplitude coefficient is same as the second amplitude coefficient.

4. The communication apparatus according to claim 1, wherein,
the calculator uses same positive threshold value and negative threshold value in both cases where the input data is the real part data, and where the input data is the imaginary part data.

5. The communication apparatus of claim 1 further comprising:
a receiver that receives a transmission signal and generates a baseband signal;
a serial-parallel converter that performs serial-parallel conversion on the baseband signal to generate a parallel signal;
a reception-side decomposer that decomposes the parallel signal into real part data which is a real part of the parallel signal, and imaginary part data which is an imaginary part of the parallel signal;
an inverse calculator that, with respect to each element a value of which is equal to or greater than a predetermined positive threshold value among elements of input data which is the real part data of the parallel signal or the imaginary part data of the parallel signal, applies a predetermined calculation which widens a difference between the value of the each element and the positive threshold value, and with respect to each element a value of which is equal to or less than a predetermined negative threshold value among the elements of the input data, applies a predetermined calculation which widens a difference between the value of the each element and the negative threshold value;
a reception-side synthesizer that synthesizes the real part data of the parallel signal and the imaginary part data of the parallel signal, which are applied the calculation by the inverse calculator;
a reception-side transformer that performs a fast Fourier transformation on a calculation result by the reception-side synthesizer to generate a subcarrier modulation signal; and
a demodulator that demodulates the subcarrier modulation signal by a predetermined demodulation scheme.

6. The communication apparatus according to claim 5, wherein,
the inverse calculator divides a value, which is obtained by subtracting a predetermined positive threshold value from a value obtained by multiplying a predetermined first amplitude coefficient greater than 1 by a value of each element the value of which is equal to or greater than the positive threshold value among the elements of the input data, by a value which is obtained by subtracting 1 from the first amplitude coefficient, and divides a value, which is obtained by subtracting a predetermined negative threshold value from a value obtained by multiplying a predetermined second amplitude coefficient greater than 1 by a value of each element the value of which is equal to or less than the negative threshold value among the elements of the input data, by a value which is obtained by subtracting 1 from the second amplitude coefficient.

7. The communication apparatus according to claim 6, wherein,
an absolute value of the positive threshold value is same as an absolute value of the negative threshold value, and the first amplitude coefficient is same as the second amplitude coefficient.

8. The communication apparatus according to claim 5, wherein,
the calculator uses same positive threshold value and negative threshold value in both cases where the input data is the real part data, and where the input data is the imaginary part data.

9. A communication method that is executed by a communication apparatus communicating with another apparatus in orthogonal frequency-division multiplexing wireless communication, the communication method comprising:
a modulation step of modulating an input signal using a predetermined modulation scheme, and assigning the modulated input signal to subcarriers with frequency components orthogonal to each other, thereby generating a subcarrier modulation signal;
a transformation step of performing an inverse fast Fourier transformation on the subcarrier modulation signal;
a decomposition step of decomposing a calculation result of the transformation step into real part data which is a real part of the calculation result, and imaginary part data which is an imaginary part of the calculation result;
a calculation step of, using a predetermined positive threshold value smaller than a maximum value among elements of an input data which is the real part data or the imaginary part data, and a predetermined negative threshold value greater than a minimum value among the elements of the input data, with respect to each element a value of which is equal to or greater than the positive threshold value among the elements of the input data, applying a predetermined calculation which reduces a difference between the value of the each element and the positive threshold value, and with respect to each element a value of which is equal to or less than the negative threshold value among the elements of the input data, applying a predetermined calculation which reduces a difference between the value of the each element and the negative threshold value;
a synthesis step of generating a baseband signal based on synthesized data in which the real part data and the imaginary part data applied the calculation in the calculation step are synthesized; and
a transmission step of generating a transmission signal from the baseband signal to transmit.

10. The communication method of claim 9 further comprising:
a reception step of receiving a transmission signal and generating a baseband signal;
a serial-parallel conversion step of performing serial-parallel conversion on the baseband signal to generate a parallel signal;
a reception-side decomposition step of decomposing the parallel signal into real part data which is a real part of the parallel signal, and imaginary part data which is an imaginary part of the parallel signal;
an inverse calculation step of, with respect to each element a value of which is equal to or greater than a predetermined positive threshold value among elements of input data which is the real part data of the parallel signal or the imaginary part data of the parallel signal, applying a predetermined calculation which widens a difference between the value of the each element and the positive threshold value, and with respect to each element a value of which is equal to or less than a predetermined negative threshold value among the elements of the input data, applying a predetermined calculation which widens a difference between the value of the each element and the negative threshold value;

a reception-side synthesis step of synthesizing the real part data of the parallel signal and the imaginary part data of the parallel signal, which are applied the calculation in the inverse calculation step;

a reception-side transformation step of performing a fast Fourier transformation on a calculation result in the reception-side synthesis step to generate a subcarrier modulation signal; and a demodulation step of demodulating the subcarrier modulation signal by a predetermined demodulation scheme.

* * * * *